US 8,118,348 B2

(12) United States Patent
Taracko

(10) Patent No.: US 8,118,348 B2
(45) Date of Patent: Feb. 21, 2012

(54) GLOVE BOX KNEE BOLSTER ASSEMBLY FOR VEHICLE AND METHOD OF MANUFACTURING

(75) Inventor: Matthew Lee Taracko, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/902,123

(22) Filed: Oct. 11, 2010

(65) Prior Publication Data

US 2011/0084512 A1    Apr. 14, 2011

Related U.S. Application Data

(62) Division of application No. 12/246,692, filed on Oct. 7, 2008, now Pat. No. 7,810,869.

(51) Int. Cl.
*B60J 9/00* (2006.01)

(52) U.S. Cl. .................................. 296/187.05

(58) Field of Classification Search ............ 296/187.05, 296/37.6, 146.7, 37.8; 293/102, 120; 220/675, 220/784, 782, 798; 280/751, 752; 206/509, 206/511, 508, 454
See application file for complete search history.

(56) References Cited

U.S. PATENT DOCUMENTS

| | | | | |
|---|---|---|---|---|
| 5,413,379 A * | 5/1995 | Koma | .......................... | 280/752 |
| 5,431,442 A * | 7/1995 | Tomita et al. | ................. | 280/752 |
| 5,904,389 A * | 5/1999 | Vaishnav et al. | ............. | 296/37.1 |
| 5,921,029 A * | 7/1999 | Stukerjurgen | .................. | 49/501 |
| 5,992,924 A * | 11/1999 | Noritake et al. | ......... | 296/187.05 |
| 6,050,628 A * | 4/2000 | Allison et al. | ............. | 296/37.12 |
| 6,050,631 A * | 4/2000 | Suzuki et al. | ............. | 296/187.05 |
| 6,213,504 B1 * | 4/2001 | Isano et al. | ..................... | 280/748 |
| 6,631,920 B1 * | 10/2003 | Webber et al. | ............. | 280/730.1 |
| 6,786,524 B2 * | 9/2004 | Tamura | ...................... | 296/37.12 |
| 6,863,329 B2 * | 3/2005 | Fero | ............................. | 296/37.8 |
| 7,132,145 B2 | 11/2006 | Shiono | | |
| 7,201,434 B1 * | 4/2007 | Michalak et al. | ........ | 296/187.05 |
| 7,311,327 B2 * | 12/2007 | Yamazaki | ..................... | 280/752 |
| 7,320,820 B2 | 1/2008 | Shiono | | |
| 7,350,841 B2 | 4/2008 | Penner et al. | | |
| 7,370,901 B2 | 5/2008 | Penner et al. | | |
| 7,422,261 B2 * | 9/2008 | Zellner et al. | ............. | 296/37.12 |
| 7,484,792 B2 * | 2/2009 | Penner | ..................... | 296/187.05 |
| 7,513,528 B2 * | 4/2009 | Penner | ......................... | 280/752 |
| 7,735,865 B2 * | 6/2010 | Cappabianca et al. | ........ | 280/752 |
| 7,874,587 B2 * | 1/2011 | Miki et al. | .................... | 280/752 |
| 2003/0207077 A1 * | 11/2003 | Riha et al. | ..................... | 428/120 |

(Continued)

*Primary Examiner* — Kiran B. Patel
(74) *Attorney, Agent, or Firm* — Kenealy Vaidya LLP

(57) ABSTRACT

A glove box and knee bolster assembly for a vehicle panel, such as an instrument panel, can include a storage bin, an energy absorbing panel, and a lid. The energy absorbing panel can include a rib wall, a first plurality of ribs, a second plurality of ribs, and a plurality of openings formed in at least one of the first plurality of ribs. The lid can include a plurality of hooks. The rear surface of the lid can be secured to the plurality of ribs by a weld. The weld can cooperate with the plurality of ribs and the rear surface to define a first load path that extends from the lid to the energy absorbing panel. The plurality of hooks can extend from the rear surface and pass through respective ones of the plurality of openings. The plurality of hooks can engage the at least one rib via the respective openings and cooperate with the at least one rib to define a second load path from the lid to the energy absorbing panel that is separate from the first load path.

7 Claims, 2 Drawing Sheets

U.S. PATENT DOCUMENTS

| | | | |
|---|---|---|---|
| 2005/0052010 A1* | 3/2005 | Best et al. | 280/751 |
| 2005/0116456 A1* | 6/2005 | Tajima et al. | 280/751 |
| 2005/0147538 A1* | 7/2005 | Williamson et al. | 422/102 |
| 2006/0038390 A1* | 2/2006 | Cho | 280/752 |
| 2007/0020420 A1* | 1/2007 | Huffel et al. | 428/36.5 |
| 2007/0205624 A1 | 9/2007 | Zellner, Jr. et al. | |
| 2008/0106110 A1 | 5/2008 | Miki et al. | |

* cited by examiner

GLOVE BOX KNEE BOLSTER ASSEMBLY FOR VEHICLE AND METHOD OF MANUFACTURING

This application is a Divisional application and claims priority under 35 U.S.C. §120 to U.S. patent application Ser. No. 12/246,692 entitled "GLOVE BOX KNEE BOLSTER ASSEMBLY FOR VEHICLE AND METHOD OF MANUFACTURING," filed Oct. 7, 2008 now U.S. Pat. No. 7,810,869. The above-referenced patent application is incorporated by reference herein in its entirety.

BACKGROUND

1. Field

The presently disclosed subject matter relates to devices, systems, and processes useful as an impact load distribution arrangement for a glove box and/or knee bolster assembly mounted to a vehicle instrument panel.

2. Description of the Related Art

Existing glove box and knee bolster assemblies often include an energy absorbing component that can minimize injury to a vehicle occupant's knee (or other body part) when the body part strikes the glove box or knee bolster lid. This energy absorbing component is typically positioned between the lid and a storage bin wall of the glove box, or between a trim panel and a structural wall. In one particular application, the energy absorbing component includes a plurality of parallel and intersecting ribs that engage a surface of the lid of the glove box. The plurality of parallel and intersecting ribs are located between the storage bin wall and the lid and are designed to carry the impact load generated when the occupant's knee (or other body part or structure) contacts the lid to absorb the energy of this impact. The lid is typically secured to the ribs by vibration welding.

SUMMARY

According to one aspect of the disclosure, a glove box/knee bolster assembly for a vehicle panel can include a lid that includes a top edge, a bottom edge, a front surface configured and dimensioned to be complementary with a contour of the vehicle panel, and a rear surface opposite the front surface. An energy absorbing panel can be located adjacent the rear surface of the lid and can have an elasticity characteristic in a direction normal to the rear surface of the lid, the energy absorbing panel having a facing surface facing the rear surface of the lid and an opposing surface facing away from the rear surface of the lid. A plurality of hooks can extend from at least one of the rear surface of the lid and the energy absorbing panel, the plurality of hooks being configured to apply at least one of a force on the opposing surface of the energy absorbing panel towards the rear surface of the lid and a force on the lid in a direction towards the energy absorbing panel. A secondary connecting structure can include at least one of a weld, an adhesive, and a screw, connecting the lid to the energy absorbing panel.

According to another aspect of the disclosed subject matter, a glove box/knee bolster assembly for a vehicle panel can include a storage bin that has a plurality of walls connected to one another. An energy absorbing panel can be located adjacent the plurality of walls, and the energy absorbing panel can cooperate with the plurality of walls to define a storage compartment having a plurality of sides and an open top. The energy absorbing panel can include a rib wall that extends across one side of the storage compartment, including a first plurality of ribs that extend from and along the rib wall, each rib of the first plurality of ribs being spaced from other ribs of the first plurality of ribs, and a second plurality of ribs that extend from and along the rib wall, each rib of the second plurality of ribs being spaced from other ribs of the second plurality of ribs, and each rib of the second plurality of ribs intersecting a respective rib of the first plurality of ribs. The energy absorbing panel can also include a plurality of openings formed in at least one of the first plurality of ribs and second plurality of ribs. A lid can be provided that includes a top edge, a bottom edge, a first side edge that extends from the top edge to the bottom edge, and a second side edge that extends from the top edge to the bottom edge. The lid can further include a front surface configured and dimensioned to be complementary with a contour of the vehicle panel, the front surface bounded by the front, top, first side, and second side edges of the lid. The lid can also include a rear surface bounded by the front, top, first side, and second side edges of the lid, the rear surface extending substantially parallel with the rib wall and secured to the first and second plurality of ribs by a weld, the weld cooperating with the first and second plurality of ribs. The rear surface of the lid can be configured to define a first load path that extends from the lid to the energy absorbing panel, and can include a plurality of hooks extending from the rear surface of the lid and passing through respective ones of the plurality of openings. The plurality of hooks can engage the first and second plurality of ribs at respective openings and cooperate with the first and second plurality of ribs to define a second load path from the lid to the energy absorbing panel that is distinct from the first load path.

According to another aspect of the disclosed subject matter, a method for manufacturing a glove box/knee bolster assembly can include providing a glove box that includes a storage bin, an energy absorbing panel connected to the storage bin, the energy absorbing panel including a rib wall and a plurality of ribs extending from and along the rib wall, and a lid that includes a rear surface and a plurality of hooks extending from the rear surface. The method can include spacing the rear surface of the lid from the rib wall with the plurality of ribs, securing the plurality of hooks to respective ones of the plurality of ribs such that the hooks apply a force to the energy absorbing panel in a direction towards the rear surface of the lid, forming a vibration weld between the rear surface of the lid and the plurality of ribs, and mounting the glove box to pivot on a vehicle panel.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A description will now be made below with respect to examples of apparatuses and methods of the presently disclosed subject matter with reference to the accompanying drawings and in accordance with exemplary embodiments of the disclosed subject matter.

Figure 1:
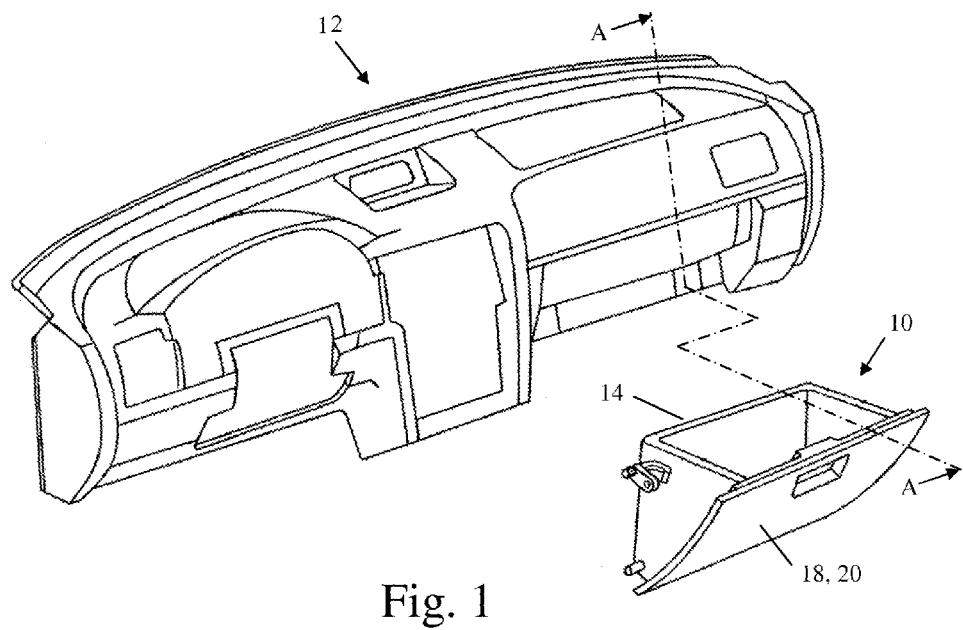
FIG. 1 is an exploded perspective view of a vehicle instrument panel and glove box assembly made in accordance with principles of the disclosed subject matter.

FIG. 1 illustrates an embodiment of a glove box assembly 10 made in accordance with principles of the disclosed subject matter. The glove box assembly 10 can be pivotally mounted to the instrument panel 12 in a manner known in the art. The glove box assembly 10 can be configured and dimensioned to receive a variety of items for storage within the instrument panel 12. The glove box assembly 10 is combined with a knee bolster structure in this particular example.

Figure 2:
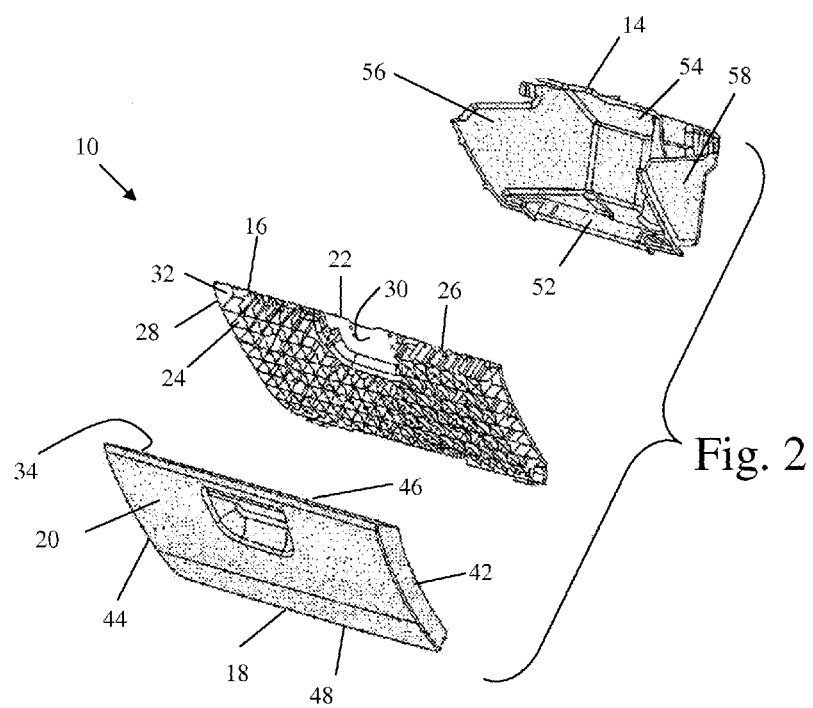
FIG. 2 is an exploded perspective view of the glove box assembly of FIG. 1.

With reference to FIG. 2, the glove box assembly 10 can include a storage bin 14, an energy absorbing panel 16 secured to the storage bin 14, and a lid 18 secured to the energy absorbing panel 16. The storage bin 14 can receive a variety of items for storage within the glove box assembly 10. The lid 18 can have a front surface 20 that is configured and dimensioned to be complimentary with the contour of the instrument panel 12.

The lid 18 and the energy absorbing panel 16 can be configured and dimensioned to carry an impact load generated by a vehicle occupant's knee (or other body part or object) that strikes the front surface 20 of the lid 18. The impact load applied by the knee to the lid 18 can be transmitted from lid 18 to the energy absorbing panel 16 via two distinct load paths between the lid 18 and the energy absorbing panel 16, as will be described in more detail below.

The energy absorbing panel 16 can include a rib wall 22 and a plurality of ribs 24, 26 that extend from one side of the wall (e.g., the side facing the lid 18 when assembled). The ribs 24, 26 can act to space the lid 18 from the rib wall 22, and include a first set of ribs 24 and a second set of ribs 26 that extend perpendicular to the first set of ribs 24. The ribs of the first set 24 can be spaced from and extend parallel to one another. The ribs of the second set 26 can also be spaced from one another and can extend parallel to one another. As illustrated in FIG. 2, the first set of ribs 24 can extend horizontally and the second set of ribs 26 can extend vertically with respect to an orientation when mounted in a vehicle. Each of the ribs 24, 26 can have an edge 28 that forms a facing surface spaced from one side 30 of the wall 22 (see also FIG. 4) and that contacts or possibly contacts a rear surface 34 of the lid 18. The first and second set of ribs 24, 26 can intersect one another to define a plurality of spaces 32. The ribs 24, 26 can be integrally molded with the rib wall 22 from a plastic material, such as polypropylene, polystyrene, polyethylene, polyvinylchloride, acrylic resins, etc., to form a single homogenous energy absorbing panel component.

Figure 3:
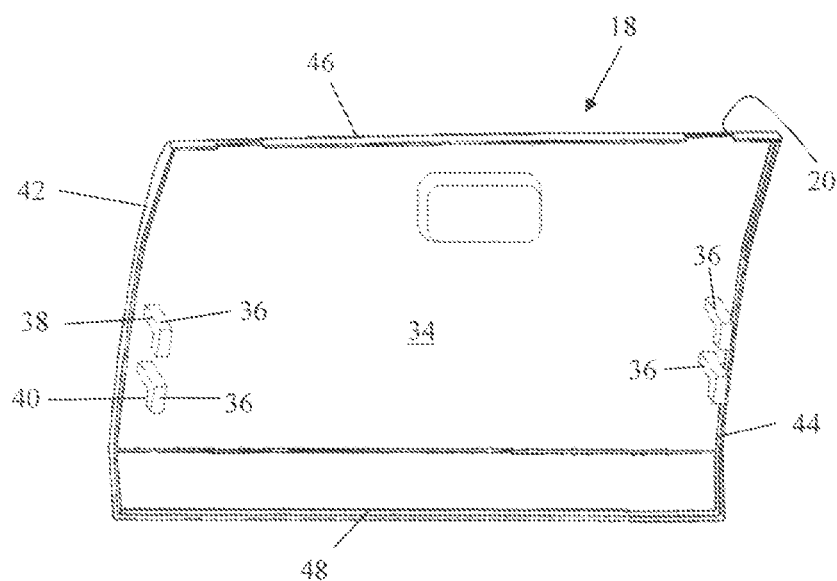
FIG. 3 is a rear view of a lid of the glove box assembly of FIG. 1.
Figure 4:
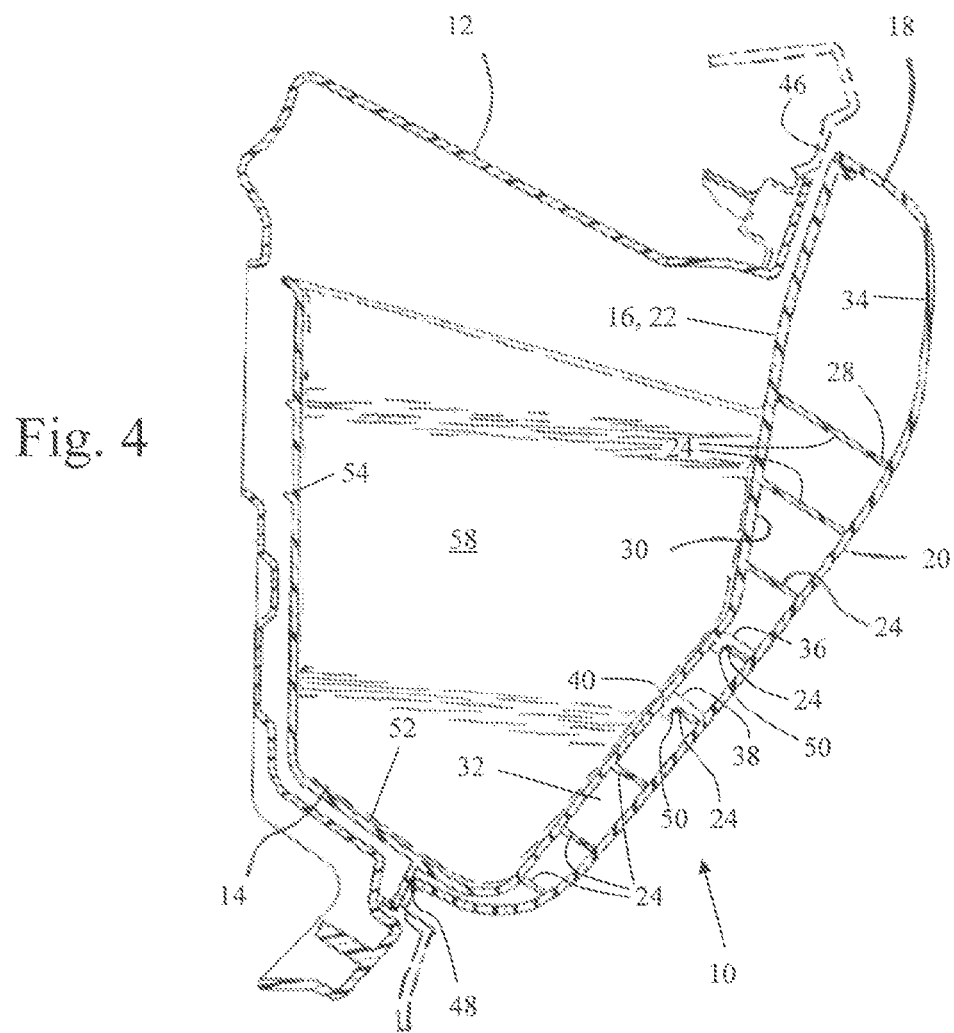
FIG. 4 is a cross-sectional view taken along line A-A of FIG. 1.

Referring to FIGS. 3 and 4, the lid 18 can include a rear surface 34 and a plurality of hooks 36 that extend from the rear surface 34 toward the one side 30 of the energy absorbing panel wall 22. Each of the hooks 36 can be L-shaped with a first leg 38 extending away from the rear surface 34 and a second leg 40 extending from the first leg 38 at a position spaced from the rear surface 34. The first leg 38 can extend perpendicular to the rear surface 34 and the second leg 40 can extend perpendicular to the first leg 38 and parallel to the rear surface 34. In the depicted embodiment, the first leg 38 has a length that is greater than the length of the second leg 40 and equal to the depth of the ribs 24, 26. Each of the second legs 40 can extend in the same direction from their respective first leg 38.

The plurality of hooks 36 can include a first set of hooks located adjacent the first lateral edge 42 of the lid 18 and a second set of hooks located adjacent the second lateral edge 44 of the lid 18. Each of the hooks 36 of the first set can be aligned along a column that extends parallel to the first edge 42. And, each of the hooks 36 of the second set can be aligned along a column that extends parallel to the second edge 44. The first and second set of hooks 36 can be located adjacent the respective lateral edges 42, 44 at a position spaced from the upper and lower edges 46, 48 of the lid 18. The hooks 36 can be integrally molded with the rear surface 34 from a plastic material, such as polypropylene, to form a single homogenous lid component.

As shown in FIG. 4, the edges 28 of the ribs 24, 26 can abut the rear surface 34 of the lid 18 to space the rear surface 34 from the one side 30 of the rib wall 22. These edges 28 can be secured to the rear surface 34 by vibration welds in a manner that is known in the art. The vibration welds can cooperate with the rear surface 34 and the ribs 24, 26 to define a first load path that extends from the lid 18 to the rib wall 22. Additionally, the lid 18 can be secured to the ribs 24 by the plurality of hooks 36.

With continued reference to FIG. 4, certain ones of the first set of ribs 24 can include at least one opening 50. The second leg 40 of each of the plurality of hooks 36 can extend into and through a respective one of the openings 50 and engage the associated rib 24. The engagement can be in the form of a friction fit, a snap fit, loss fit, or other similar engagement. The openings 50 can be formed in the respective ribs 24 at a location along the ribs 24 that abuts the one side 30 of the rib wall 22. The second leg 40 can also abut the one side 30 of the rib wall 22. The hooks 36 can engage the certain ones of the ribs 24 along the openings 50 to define a second load path from the front surface 20 of the lid 18 through the ribs 24, 26 and to the rib wall 22 when a vehicle occupant's knee strikes the front surface 20. The second load path can be distinct from the first load path. In addition, the hooks 36 can be configured and made from a material that provides a different elasticity for the second load path as compared to the first load path. Moreover, the overall elasticity characteristic of the ribs 24, 26 in a direction normal to the surface 30 of the rib wall 22 can be different than the overall elasticity characteristic of the hooks 36 when engaged with the surface 30 of the rib wall 22. In addition, the hooks 36 ensure contact between lid 18 and the ribs 24, 26 to provide a consistent amount of damping when an object strikes the front surface 20 of the lid 18.

Referring to FIGS. 2 and 4, the storage bin 14 can include a plurality of walls 52, 54, 56, 58 connected to and extending from one another. The plurality of walls 52, 54, 56, 58 can be integrally molded as a single piece from a plastic material, such as polypropylene, to form a single homogenous storage bin component, or can be separate components that are adhered or otherwise attached via known attachment structures. As illustrated in FIGS. 1, 2 and 4, the lid 18, energy absorbing panel 16, and storage bin 14 define a receptacle having an opening extending across the top to provide a vehicle occupant with access to the storage bin 14.

In this exemplary embodiment, the energy absorbing panel 16 is shown and described as a separate component from the storage bin 14. However, it is possible to integrally form the storage bin 14 and the energy absorbing panel 16 as a single homogenous component. Alternatively, the storage bin 14 can include an additional wall that spans from the left side wall 56 to the right side wall 58 and the ribs 24, 26 (with or without a separate wall such as rib wall 22 of FIGS. 2-4) can be affixed to this additional wall.

While certain embodiments of the disclosed subject matter are described above, it should be understood that the disclosed subject matter can be embodied and configured in many different ways without departing from the spirit and scope of the disclosed subject matter. For example, if a glove box is not desired in a particular vehicle, a dedicated knee bolster assembly can be provided in place of the glove box. The knee bolster assembly could simply be mounted in a non-pivoting manner with respect to the instrument panel, and no box or storage structure provided within the knee bolster lid. The absorbing panel and hook structures can be connected to the lid of the knee bolster in a manner similar to that of the glove box structure described in detail above. It should also be understood that while the ribs 24, 26 are shown as crossing each other at right angles, the angle of crossing can vary. In addition, the ribs 24, 26 could also be non-linear or wavy structures that cross each other at various random or dedicated angles in accordance with either a design purpose or in accordance with a desire to provide different elasticity characteristics at certain locations of the front surface 20 of the lid 18. The ribs 24, 26 are disclosed as being formed homogonously and continuously with the wall 22. However, it is contemplated that the ribs 24, 26 could be a separate structure that can be separately adhered or attached to the wall 22 or even to the lid 18. Moreover, if the ribs 24, 26 are attached or are integrated with the rear surface 34 of the lid 18, the hooks 36 could be provided extending from the surface 30 of the rib wall, and could be attachable to the ribs 24, 26 in an opposite direction as compared to that shown in the drawings.

Although openings 50 are disclosed in the ribs 24, 26 to provide an attachment structure to which the hooks 36 can be attached, it is also contemplated that separate connective structures could be provided on the ribs 24, 26 for attachment to the hooks 36. For example, a metal clasp or spring lock could be molded into the ribs 24, 26 or rib wall 22 to provide an anchor for the hooks 36 to attach. Additionally, the hooks 36 can take on a variety of shapes sizes, materials, and configurations, depending on a particular application, including being formed as a ratchet type hook that would allow a variable amount of connective force to be applied between the hooks 36 and the ribs 24, 26 or rib wall 22. Additionally, it should be noted that the configuration of the hooks 36 can be in any of various directions, including up, down, left, and right with respect to the lid 18. In addition, the relative direction between different hooks 36 can be aligned in the same direction or can be in different directions. For example, the hooks 36 could be in opposition to each other or in alternating directions to provide a secure connection when connected to the energy absorbing panel 16.

The vibration weld for attaching the rear surface 34 of the lid 18 to the edge 28 of the ribs 24, 26 could also be replaced with an adhesive or a separate attachment structure without departing from the spirit and scope of the presently disclosed subject matter.

Ribs 24, 26 are shown as a main component of the energy absorbent panel 16. However, other structures could be provided in place of the ribs, such as a rigid or soft foam damper or even spring type structures. In such a case, the hooks 36 could be configured to attach to the side surface 30 of the rib wall 22 directly or a separate attachment structure could be provided within the damper or spring for attachment to the hooks 36.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A method for manufacturing a glove box/knee bolster assembly, comprising:
   providing a glove box assembly that includes,
      a storage bin,
      an energy absorbing panel connected to the storage bin, the energy absorbing panel includes a rib wall and a plurality of ribs extending from and along the rib wall, and
      a lid that includes a rear surface and a plurality of hooks extending from the rear surface;
   spacing the rear surface of the lid from the rib wall with the plurality of ribs;
   securing the plurality of hooks to respective ones of the plurality of ribs such that the hooks apply a force to the energy absorbing panel in a direction towards the rear surface of the lid;
   forming a vibration weld between the rear surface of the lid and the plurality of ribs; and
   mounting the glove box to pivot on a vehicle panel.

2. The method according to claim 1, further comprising:
   configuring the lid and energy absorbing panel to distribute an impact load from the lid to the energy absorbing panel using a first load path and a second load path that is distinct from the first load path, wherein the first load path extends from the lid through the vibration weld and the plurality of ribs and into the rib wall and the second load path extends from the lid through the hooks and the respective ones of the plurality of ribs and into the rib wall.

3. The method according to claim 1, wherein:
   providing a glove box assembly further includes forming a plurality of openings in the plurality of ribs; and
   securing the plurality of hooks further includes,
      extending a portion of each of the hooks through a respective one of the plurality of openings, and
      engaging the plurality of ribs at the openings with a respective one of the hook portions.

4. The method according to claim 1, further comprising:
   engaging the rib wall with the hooks.

5. The method according to claim 1, wherein providing the glove box assembly further includes molding the lid and the hooks as a single homogenous component.

6. The method according to claim 1, wherein providing a glove box assembly includes providing a plurality of ribs that include a first plurality of ribs that extend in a first direction and a second plurality of ribs that extend in a second direction and cross the first plurality of ribs to form substantially polygonal openings, and securing the plurality of hooks includes extending the hooks into selected ones of the substantially polygonal openings and engaging the hooks with a second set of openings located in at least one of the first and second plurality of ribs, each of the second set of openings having a central axis that extends in a direction substantially normal to a central axis of a respective one of the substantially polygonal openings.

7. The method according to claim 1, further comprising:
   spacing the rear surface of the lid from the rib wall such that the rear surface of the lid faces the rib wall;
   securing the lid and the plurality of ribs to each other via an attachment structure that includes the plurality of hooks such that at least one of,
      the lid applies a force on the energy absorbing panel in a direction towards the lid, and
      the energy absorbing panel applies a force on the lid in a direction towards the energy absorbing panel;
   configuring the lid and energy absorbing panel to distribute an impact load from the lid to the energy absorbing panel using a first load path and a second load path that is distinct from the first load path, wherein the first load path extends from the lid through the vibration weld and the plurality of ribs and into the rib wall, and the second load path extends from the lid through the attachment structure and plurality of ribs and into the rib wall.

* * * * *